United States Patent
Fasbender et al.

(10) Patent No.: US 8,879,524 B2
(45) Date of Patent: Nov. 4, 2014

(54) SERVICE DELIVERY TO A CONSUMER ELECTRONIC DEVICE USING A MOBILE COMMUNICATION UNIT FOR ACCESS AND SERVICE CONTROL

(75) Inventors: Andreas Fasbender, Aachen (DE); Martin Gerdes, Monschau-Rohren (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1009 days.

(21) Appl. No.: 12/935,984

(22) PCT Filed: Apr. 2, 2008

(86) PCT No.: PCT/EP2008/053965
§ 371 (c)(1),
(2), (4) Date: Dec. 8, 2010

(87) PCT Pub. No.: WO2009/121409
PCT Pub. Date: Oct. 8, 2009

(65) Prior Publication Data
US 2011/0176524 A1   Jul. 21, 2011

(51) Int. Cl.
*H04W 4/00* (2009.01)
*H04L 12/28* (2006.01)
*H04L 29/06* (2006.01)
*H04L 29/08* (2006.01)

(52) U.S. Cl.
CPC ........ *H04L 65/1073* (2013.01); *H04L 12/2818* (2013.01); *H04L 12/2809* (2013.01); *H04L 67/32* (2013.01)
USPC .......................................................... 370/338

(58) Field of Classification Search
None
See application file for complete search history.

(56) References Cited

U.S. PATENT DOCUMENTS

| 2003/0100962 A1 | 5/2003 | Sumita et al. | |
| 2005/0262548 A1* | 11/2005 | Shimojo et al. | 725/135 |
| 2007/0181691 A1* | 8/2007 | Chang | 235/462.41 |
| 2008/0046570 A1* | 2/2008 | Abel | 709/227 |

FOREIGN PATENT DOCUMENTS

| JP | A 2000-156709 | 6/2000 |
| JP | A 2006-174320 | 6/2006 |

* cited by examiner

*Primary Examiner* — Andrew Lai
*Assistant Examiner* — Leon Andrews (57) ABSTRACT

The present invention relates to a method for providing connectivity information, regarding a consumer electronic device that is connected to a local network, to an Internet server. The method includes a step of a mobile communication unit retrieving the connectivity information of the consumer electronic device from the local network and then transmitting the connectivity information of the consumer electronic device to the Internet Server via an access network independent from the local network.

31 Claims, 3 Drawing Sheets

SERVICE DELIVERY TO A CONSUMER ELECTRONIC DEVICE USING A MOBILE COMMUNICATION UNIT FOR ACCESS AND SERVICE CONTROL

TECHNICAL FIELD

The present invention relates to the delivery of multimedia services to a consumer electronic device. The invention relates especially to the delivery of multimedia services provided in an application logic accessible through a global network, such as the Internet, to consumer electronic devices connected to a local network.

BACKGROUND

The increasing digitization of media and the rapid proliferation of broadband access have resulted in a growing adoption of WiFi or Ethernet-based home networks, connecting networked consumer appliances such as streaming audio and video clients to e.g. home PCs or other consumer electronic devices such as network-attached storage devices. DLNA (Digital Living Network Alliance) acts as a leading certification body for consumer electronic devices based on UPnP (Universal Plug and Play) and web standards to facilitate smooth interworking between home media appliances.

At the same time, consumers increasingly make use of online services, such as online music portals, video on demand (VoD) services or community web sites. In the future it is expected that the demand for interworking solutions between off-the-shelf consumer electronic devices (e.g. based on DLNA) and online network services (e.g. based on IMS (IP Multimedia Subsystem)) or web services will be rapidly increasing. It is desirable to provide end-to-end solutions that enable interworking between DLNA appliances and IMS-controlled operator services based on an intermediary gateway function that provides the required interworking logic. In this architecture IMS services can be launched and controlled on standard non-IMS consumer electronic equipment, such as a DLNA-powered TV.

Furthermore, the users of mobile communication units, such as cellular phones or PDAs (Personal Digital Assistants), are also increasingly accessing online music and television services, news and blogging portals and other data services from their mobile phones.

In a 3GPP (Third Generation Partnership Project) environment, the mobile phone hosts a subscriber identity module (SIM) used to securely authenticate the user towards the network, connect the user equipment to the subscribed service portfolio and subsequently charge subscribers based on service usage.

The operator of the cellular network of the mobile communication unit typically provides the user with quick links to services, such as online media portals, so that for example access to multimedia sources is just one click away in the mobile communication unit's browser.

While accessing online services on a personal computer or a cellular phone is simple for the user and supported by sophisticated input devices, such as a keyboard/-pad and mouse/five-way-buttons, consumer electronic devices, such as TVs, streaming clients or Internet radios, lack these input mechanisms and are typically operated via buttons or at most an advanced remote control.

Using a remote control it is virtually impossible to enter a uniform resource locator (URL) to address online resources. For ease-of-use, URLs must be either pre-provisioned in the consumer electronic device's browser or the application or portal environment provides links to online content. This obviously limits flexibility, for example when a resource address changes or when the user wants to add content sources to the repository.

Another important aspect can be seen in the fact that devices not belonging to the user's own environment, such as a hotel TV or a friend's music streaming device, do not have any knowledge about the user's operator relationships and services and can therefore not provide access to the user's service portfolio.

Mechanisms have been deployed providing authentication to a user's service repository and for using the mobile communication unit for payment, e.g. based on reverse SMS. By way of example iPX (Internet Payment Exchange) is offering a payment solution where the user can enter his mobile phone number in a web service. iPX then sends an SMS to the user's phone assuming he or she sits close to the requesting device. Once confirmed, iPX approves the payment and the content can be delivered to the requesting device.

The iPX solution shows the benefits of operator-enabled micro-payments in terms of security and charging, however, entering a mobile phone number, e.g. on a TV, can be very tedious or even impossible.

SUMMARY

Accordingly, a need exists to provide a solution that exploits the benefits of operator-controlled service delivery and charging, while at the same time enabling virtually any consumer electronic devices to consume operator-offered services. The mobile communication unit, such as the mobile phone, should be used to request access to and control delivery of the services, whereas this service itself is delivered to the consumer electronic device, such as a TV.

This need is met by the features of the independent claims. In the dependent claims preferred embodiments of the invention are described.

According to a first aspect of the invention a method is provided in which a mobile communication unit provides a connectivity information of the consumer electronic device connected to a local network to an application logic. The method comprises the step of retrieving, by the mobile communication unit, the connectivity information of the consumer electronic device from the local network, the mobile communication unit transmitting the retrieved connectivity information of the consumer electronic device to the application logic. The connectivity information is transmitted via an independent access network independent from the local network. Even though the mobile communication unit can retrieve the connectivity information of the consumer electronic device from the local network, the mobile communication unit cannot attach to the local network, meaning that the mobile communication unit can build up no connection to the local network. The above-described method has the advantage that the service authentication and control can be kept in the user's mobile communication unit building on an existing phone subscription, whereas the impact on the consumer electronic device connected to the local network is minimized. The mobile communication unit is used as a kind of connecting element to build up a connection between the application logic and the consumer electronic device provided in the local network. The claimed invention provides a solution to the issue of connecting standard consumer electronic devices to operator-offered or aggregated online services in an easy and secure way making use of the mobile communication unit as an always-on and always-with-you tool for authentication service control and charging.

Preferably, the connectivity information is used by the application logic accessible through a global network to provide and stream multimedia services contained on the application logic to the consumer electronic device. The multimedia service can be any kind of service in connection with a multimedia file, be it an audio file, a video file or a combined audio and video file. However, the invention is not limited to media files. The service could comprise any other service which can be delivered to the consumer electronic device.

According to one embodiment of the invention the connectivity information is presented to the user of the mobile communication unit and is detected by the mobile communication unit which then transmits the connectivity information to the application logic. The connectivity information can be presented to the mobile communication unit in different ways. As will be explained in detail further below, the connectivity information may be presented in a visual form on a display, so that the connectivity information as displayed can be detected by an image sensor of the mobile communication unit and then transmitted to the application logic.

However, other transmission paths of the connectivity information to the mobile communication unit are perceivable, such as by a wireless transmission or by a wired connection.

According to one embodiment of the invention the connectivity information of the consumer electronic device connected to the local network is encoded in a bar code format, the bar code format being detected by the image sensor of the mobile communication unit, decoded by the mobile communication unit and then transmitted to the application logic. Nowadays communication units are frequently provided with visual image sensors for taking pictures or for making movies. In one aspect of the invention this image sensor of the mobile communication unit detects the connectivity information encoded in the bar code format and decodes it. The bar code format is one possibility to encode the connectivity information in a machine readable format. It should be understood that any other machine readable format can be used.

The connectivity information retrieved by the mobile communication unit may be received in an encrypted format. Accordingly, the mobile communication unit receiving the connectivity information in an encrypted format may decrypt the connectivity information before it is transmitted to the application logic. In another embodiment the encrypted connectivity information is transmitted to the mobile communication unit, from the mobile communication unit to the application logic, the application logic decrypting the connectivity information. The application logic receiving the connectivity information provides a multimedia service contained on the application logic and requested by the user of the mobile communication unit and transmits it from the application logic to the consumer electronic device on the basis of the connectivity information transmitted by the mobile communication unit.

As stated above, the mobile communication unit transmits the connectivity information via an independent access network. In one embodiment of the invention the independent access network may be a cellular communication network of the mobile communication unit. The transmission to the application logic, such as an application server provided on the Internet, is not limited to a cellular communication network. The transmission may also be carried out by using the WiMAX (Worldwide Interoperability for Microwave Access), WiMAX being a telecommunications technology aimed at providing wireless data over long distances in a variety of ways from point-to-point links to full mobile cellular type access. Wireless LAN is another possibility on which the transmission of the connectivity information to the communication logic can be based upon.

According to one embodiment of the invention, the mobile communication unit initiates a session invocation dialog with the application logic of the global network when the communication unit has received the connectivity information. Within this flow the destination parameters are exchanged with the application logic, which can then deliver the service accordingly.

The above-described aspects mainly focus on the aspects of the invention relating to the mobile communication unit. In the following the aspects of the invention relating to the consumer electronic device and the local network are further illustrated. According to another aspect of the invention, a method is provided providing the connectivity information of the consumer electronic device connected to the local network and accessible through the global network, the local network being connected to the global network via a gateway. The local network comprises a local control unit controlling the gateway and a connectivity information of the consumer electronic device in the global network. The method according to this aspect of the invention comprises the step of retrieving, by the local control unit, the connectivity information from the consumer electronic device. The local control unit then encodes the retrieved connectivity information in a machine readable format and provides the encoded connectivity information of the consumer electronic device for transmission to the mobile communication unit. This method described above enables connecting any consumer electronic device at any connected location to operator online services that the user of the mobile communication has subscribed to and to subsequently divert content and services to the consumer electronic device of choice in the remote local network. By way of example a multimedia service provided on the global network, such as a VoD movie, can be streamed to the user's connected hotel TV, the hotel TV being the consumer electronic device. When the multimedia service is streamed to this hotel TV rather to the mobile communication unit, the service experience can be significantly improved. In another application of the invention, a digitized home music collection can be rendered on a vehicle stereo via operator-offered remote access to the home server instead of requiring the user to copy the music to his portable music player and headphones for listening.

In one advantageous embodiment the local control unit detects a local address of the consumer electronic device, through which the consumer electronic device can be reached within the local network and replaces the local address by the corresponding global address of the global network that has to be used to reach the consumer electronic device from the application logic of the global network. Preferably, the local control unit determines a global routable network address of the gateway to which the multimedia service provided on the application logic should be directed. The local control unit configures the gateway in the local network in such a way that the consumer electronic device is capable of receiving the transmitted multimedia service. The application logic then, based on the global address, directs the multimedia service through the global network to the consumer electronic device in the local network. In the case of the Internet, the local control unit replaces the local address by the corresponding global IP address. The connectivity information in this embodiment contains the global routable network address. As the gateway controls the accessibility of the consumer electronic device in the local network, the local control unit determines the port of the gateway to which the multimedia service should be directed, the connectivity information containing the port information.

According to one embodiment of the invention, the local control unit depicts the consumer electronic devices present in the local network and the corresponding multimedia capabilities of each consumer electronic device and determines the consumer electronic devices that are made available for delivery of the multimedia service provided by the application logic. Based on the consumer electronic devices present in the local network, the local control unit may generate a list of available consumer electronic devices of the local network, the list containing the available consumer electronic devices together with their connectivity information.

Once this list has been generated, several possibilities exist to transfer the connectivity information to the application logic. In one embodiment the list of available consumer electronic devices is presented to the user of the mobile communication unit, wherein when the user of the mobile communication unit has selected one or more of the available consumer electronic devices from the list, the local control unit transmits the information about the selected consumer electronic device together with its connectivity information to the mobile communication unit. In one embodiment, the list of available consumer electronic devices is displayed to the user of the mobile communication unit on a display of a consumer electronic device. The displayed consumer electronic devices and the respective connectivity information can then be detected by the mobile communication unit using the image sensor of the mobile communication unit.

In another embodiment the list of available consumer electronic devices is stored on the local network and a link is generated through which the list of available consumer electronic devices together with the corresponding connectivity information can be reached by the application logic through the global network. Instead of displaying the different consumer electronic devices, the local control unit transmits the link of the stored list to the mobile communication unit or provides it for transmission by displaying the link on the display of the consumer electronic device. The list or the link are stored in the local network in a machine readable format. By way of example the list of the available consumer electronic devices together with their connectivity information can be encoded in a bar code format and displayed on the consumer electronic device. The same can be done for the link through which the list can be reached by the application logic. The main advantage of the bar codes is that they are easy to deploy and can be facile integrated into any application. Bar codes can be interpreted by standard mobile phones today by using the image sensor, such as a camera provided in the mobile phone. The reader reading the bar code may either by integrated in the camera itself or a picture is taken, the picture being fed to an application within the mobile phone decoding the bar code into a connectivity information.

Another possibility to transmit the connectivity information of the selected consumer electronic device or the link to the mobile communication unit is a wireless transmission technology, such as a Near Field Communication (NFC) technology. This NFC technology is a short-range wireless technology enabling the communication between devices over a short distance. NFC is an open platform technology standardized in ECMA-340 and ISO/IEC 18092 and is mainly aimed at being used with mobile phones.

There are three main use cases supported:
Card emulation, i.e. the NFC device behaves like a contactless card
Reader mode: the NFC device is active and reads a passive RFID tag
Two NFC devices are communicating together in peer-to-peer mode and exchange information.

Both the reader and the P2P mode could be used to establish a short-term relationship of the user's phone with the local environment in order to exchange the above-described port and consumer electronic device parameters.

NFC requires wide deployment in order to be applicable in this context, and physical tags are naturally more static than bar codes, i.e. if network or device parameters change, a re-programming of the tag is required.

Another possibility is to transmit the connectivity information of the selected consumer electronic device or the link using the Bluetooth technology, the Bluetooth technology being another short-distance communication technology. The Bluetooth PAN (Personal Area Network) profile is another option to establish a short-term communication relationship of the mobile communication unit with the local environment. Once the link is established, the required parameters can be exchanged over standard protocols. Another possibility is to transmit the connectivity information of the selected consumer electronic device or the link using a wireless transmitter of the local network, such as wireless LAN or WiFi. In one embodiment the local control unit encrypts the connectivity information before providing it for transmission to the mobile communication unit, the mobile communication unit or the application logic decrypting the received connectivity information.

As the mobile communication unit is used to transmit the connectivity information to the application logic, the user of the requested service can be identified on the basis of a subscriber identification information of the mobile communication unit. The user of the mobile communication unit can be charged for the requested service using this subscriber identification information.

In case the application logic requests the list of consumer electronic devices from the local network using the transmitted link transmitted from the mobile communication unit, the application logic transmits the list of available consumer electronic devices to the user of the mobile communication unit. The user can then select in the list one or more of the consumer electronic devices of a service delivery. When the consumer electronic device has been selected by the user, the multimedia service can be delivered by the application logic and transmitted to the local network. In the local network the service can be directly transmitted to the consumer electronic device using the correct port or number. In another embodiment the multimedia service is transmitted to the local control unit of the local network, the local control unit delivering the multimedia service to one or more of the consumer electronic devices within the local network.

According to another aspect of the invention, a method is provided for encoding the connectivity information of the consumer electronic device, the method comprising the steps of retrieving the connectivity information, allowing to connect the consumer electronic device to the global network.

According to another step of this method, the retrieved connectivity information is encoded in the bar code format.

A further aspect of the invention provides the mobile communication unit transmitting the connectivity information, the communication unit comprising a receiver receiving the connectivity information of the consumer electronic device from the local network. The mobile communication unit furthermore comprises a decoding unit decoding the received connectivity information and a transmitter transmitting the received connectivity information to the application logic using the independent access network independent from the local network. The decoding unit of the mobile communication unit may comprise a bar code decoder decoding the connectivity information received in the bar code format in case the bar code is decoded in the mobile communication unit and not in the application logic. When the application logic is responsible for the decoding, the decoding unit may be comprised in the application logic.

A further aspect of the invention is to provide a local network control unit providing the connectivity information of the consumer electronic device. The local control unit may comprise a retrieving unit retrieving the connectivity information from the consumer electronic device that is connected to the local network and accessible through the global network, the local network being connected to the global network via the gateway. Furthermore, an encoding unit may be provided in the local network control unit for encoding the retrieved connectivity information of the consumer electronic device in a machine readable format. Furthermore, an output unit for outputting the encoded connectivity information to the mobile communication unit may be provided. In case the connectivity information is encoded in a bar code format, the encoding unit comprises a bar code format encoding unit encoding the retrieved connectivity information in a bar code format. As an output unit a display may be used displaying the received connectivity information. This display may be the display of a consumer electronic device or any other display. When the connectivity information is transmitted to the mobile communication unit, a transmitter, be it a wireless transmitter or a wired transmitter, may be provided as output unit.

BRIEF DESCRIPTION OF THE DRAWINGS

The present invention will become more fully understood from the detailed description of embodiments of the present invention given herein below and the accompanying FIGS. 1-3 which are given by way of illustration only and thus are not limitative of the present invention.

Figure 1:
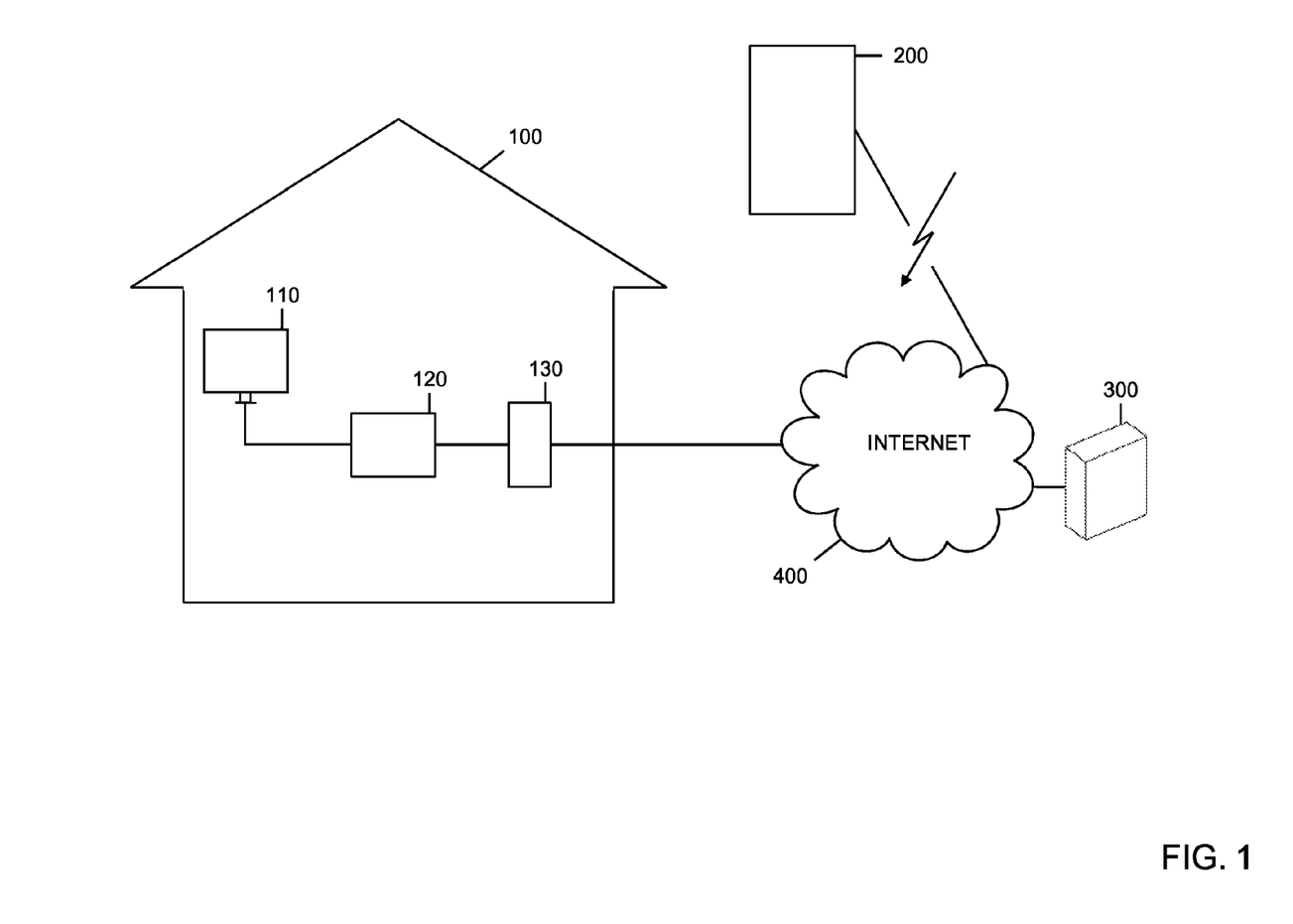
FIG. 1 is a schematic block diagram of the system and the different components used for transmitting a connectivity information of a consumer electronic device.

In the following, the invention will be explained in further detail with reference to the accompanying drawings. FIG. 1 shows the environment in which the present invention can be used. FIG. 1 shows a setup where a user of a mobile phone 200 enters a remote location 100, here shown as a hotel. In the remote location 100 a local network is provided to which consumer electronic devices 110, such as televisions, are connected. The local network furthermore comprises a local control unit 120 controlling the local network and controlling the access of the consumer electronic devices 110 to the global network/Internet 400. The local network of the hotel is connected to the global network, such as the Internet, via a gateway 130.

The mobile communication unit 200 of the user may be a cellular phone, a PDA or a laptop or any other portable unit. The user intends to deliver online media streaming services provided on the application logic 300, such as an Internet server, to the consumer electronic device 110 connected to the remote local network. Preferably, the local network is connected to the global network or Internet 400 through a broadband connection allowing the delivery of media files, such as music titles or films.

In the present case it is assumed that the mobile communication unit has no direct connection to the local network that would enable it to directly control the local resources, such as the televisions 110, using WiFi (wireless fidelity) and UPnP (Universal Plug and Play). The consumer electronic device, which can be a media player or any other device being configured to output the requested multimedia service, has a trust relationship established within its local environment. The local control unit 120 which can also be an application server is in place and has the control over the broadband gateway 130 to the Internet via UPnP, an IGD (Internet Gateway Device) protocol or other protocols. The local control unit is configured to open or close ports for managing access control from devices of the local network to external devices and controls firewall settings for incoming requests, such as communication cells or media services. It is also configured in such a way that it can keep track of the user's actions for charging purposes.

In the present case the user of the mobile communication unit 200 entered the remote location, such as the hotel, and now wants to deliver a multimedia service to the consumer electronic device 110 provided in the remote location. The mobile communication unit 200 cannot directly access the local network in the remote location. The present invention, however, provides a possibility to nevertheless stream a media file provided on the application server 300 to the consumer electronic device 110.

In the following example it is assumed that the user of the mobile communication unit has an active cellular subscription with a mobile operator. This operator is assumed to provide all consumer services in this invention, such as remote access, IPTV (Internet Protocol Television), a system where a digital television service is delivered by using Internet protocol over a network infrastructure, and online media access. These services might in turn be sourced in from other third party providers. However, invocation and control of the service provided is performed in the operator service layer.

The local network which can be a hotel or a friend's home, a car or a hot spot hosts one or more consumer electronic devices connected to the local network. Preferably, these consumer electronic devices comply with the DLNA (Digital Living Network Alliance) standard. Without limiting applicability, it is assumed in the following that only one media player renders HTTP-streamed content. Other options, such as RTP (Real-time Transport Protocol) support can be supported as required. The consumer electronic device 110 is connected to the broadband network via a gateway 130 and has an established trust and network access relationship within the domain, for example due to the fact that it is connected via Ethernet or WiFi-protected LAN access.

The local control unit may have control of the NAT (Network Address Translation) function in the local gateway, thereby being capable of admitting or denying session requests arriving from the global network or Internet 400. This function can reside on a PC within the local network or in the access gateway itself. An example is an implementation based on the UPnP Internet Gateway Device profile.

The service that the user intends to launch can be rendered on the consumer electronic device 110. This means that the media protocols used for end-to-end delivery are supported both at the operator service layer as well as the consumer electronic device. One example would be a HTTP-based music streaming service with MP3 encoding that can be rendered on any DLNA device.

Figure 2:
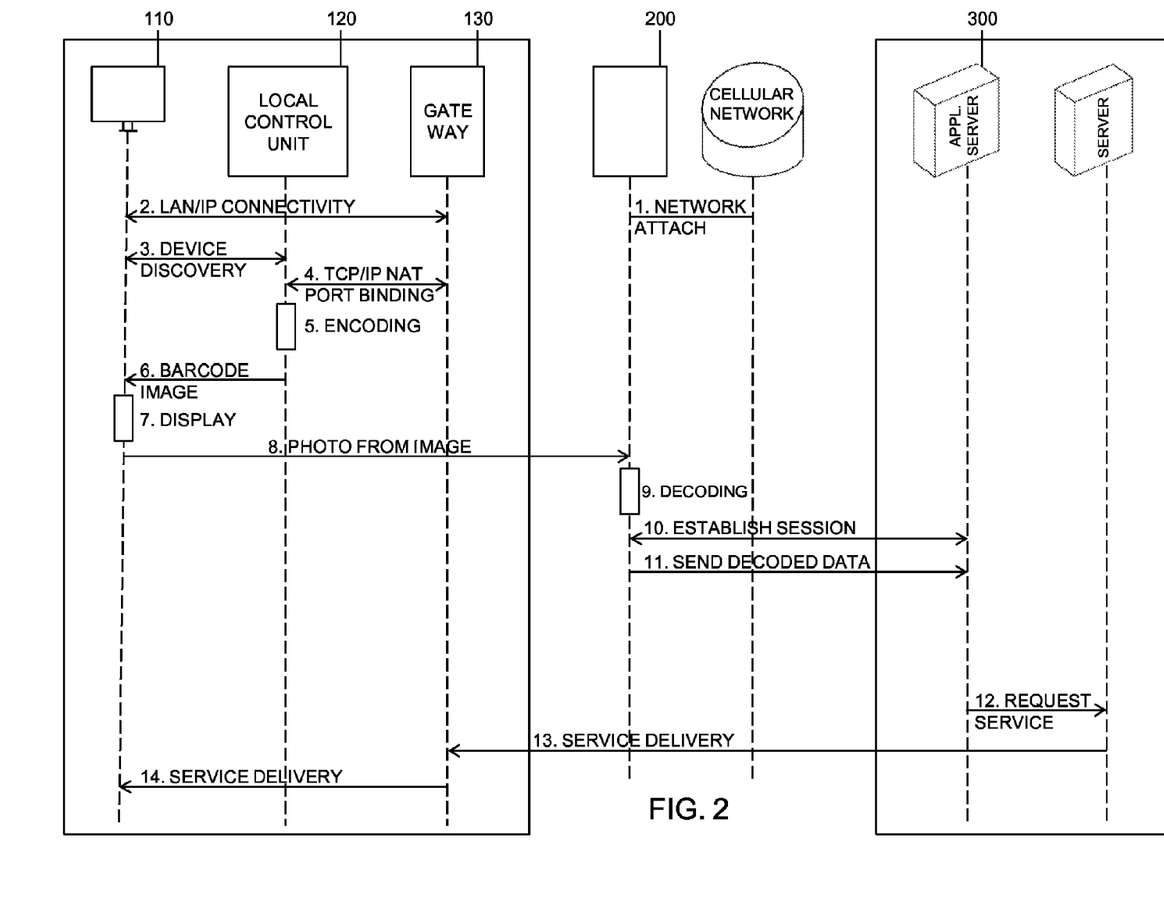
FIG. 2 shows the signaling associated with the different components of the system shown in FIG. 1 for transmitting a connectivity information and for delivering a multimedia service to a selected consumer electronic device.
Figure 3:
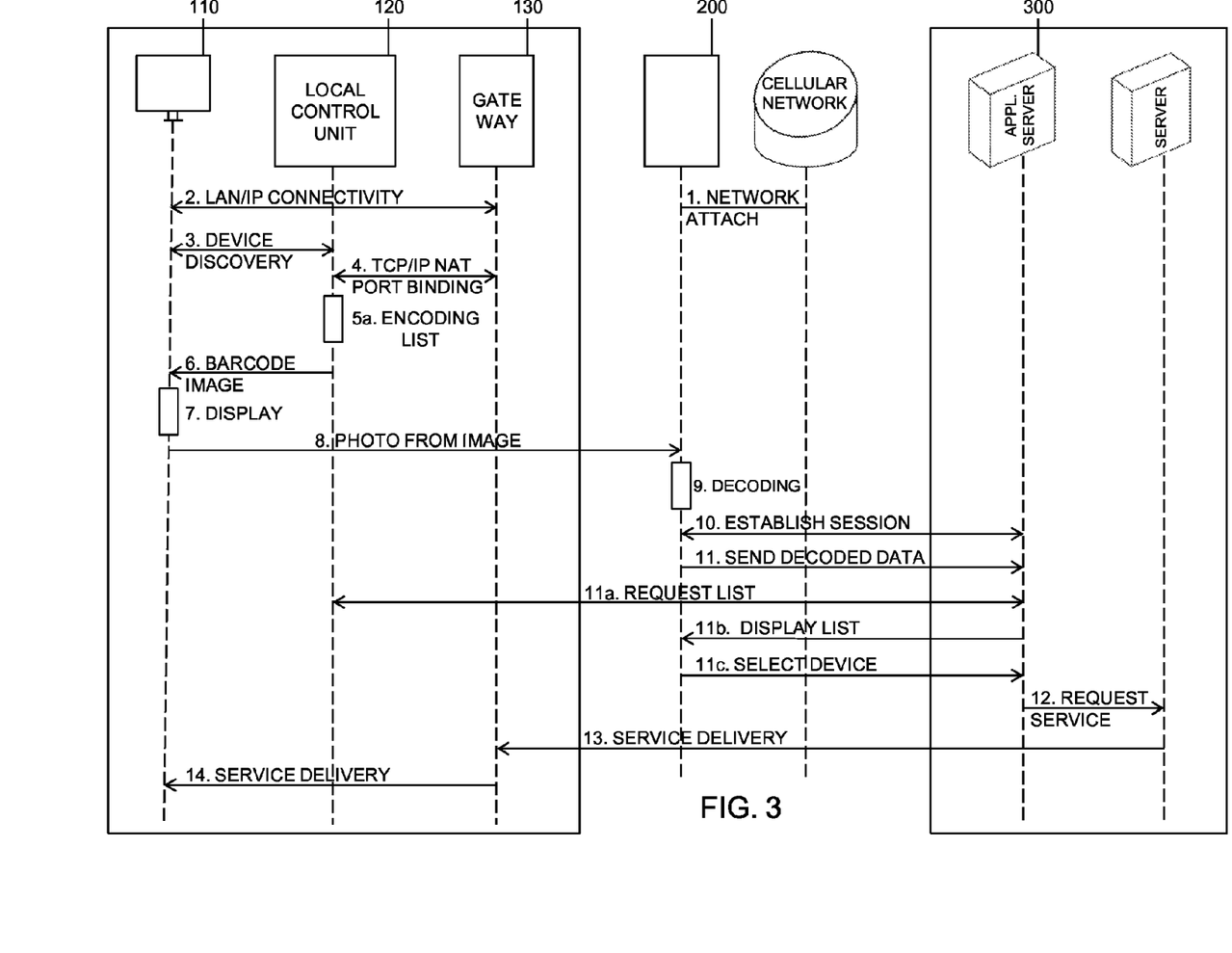
FIG. 3 shows another embodiment showing the signaling of the different components shown in FIG. 2 in another embodiment.

In FIGS. 2 and 3 a flowchart is shown explaining the different steps of the method for delivering multimedia services to the consumer electronic device 110. In the following reference is made to FIG. 2. First of all, the mobile communication unit must be connected to the cellular network (step 1). The user of the consumer electronic device 200 can in step 2 switch on the consumer electronic device, the consumer electronic device connecting to the local network via standard mechanisms, e.g. requesting an internal or external IP address from the DHCP (Dynamic Host Configuration Protocol) server in the gateway 130. On the consumer electronic device a menu structure for controlling the consumer electronic device may be provided. In the menu structure the user may select a menu item indicating that a multimedia service should be delivered to the consumer electronic device. When a service delivery is initiated in the consumer electronic device, the steps shown in FIGS. 2 and 3 may be initiated. As mentioned above, in step 2 the IP address is requested from the gateway. The local control unit present in the local network is able to create NAT (Network Address Translation) port bindings on the gateway. The local control unit has registered the local consumer electronic device as a device capable of receiving services from the global network. In step 3 the local control unit discovers the consumer electronic device through standard mechanisms, e.g. UPnP device and service discovery or SIP (Session Initiation Protocol) registry procedures. This information can also be hard-coded or manually entered through a management console.

Optionally, the local control unit registers either automatically or through manual configuration parameters, such as media capabilities of the consumer electronic device (e.g. supported screen resolution, codecs, etc.), and holds them in a local database. In step 4 the local control unit configures the access gateway to create a port binding for the consumer electronic device for media session requests coming from external services.

As can be seen from FIG. 2, an encoding step is carried out in step 5, the local control unit comprising an encoding unit for encoding the retrieved connectivity information such as the local IP address and the port binding. The local control unit may replace the local network address through a global routable network address such as the global IP address and the port of the gateway through which the consumer electronic device can be reached through the global network. The encoding unit encodes the local network and device parameters in a machine readable format and replaces them by the external connectivity information of the consumer electronic devices within the visited network through the access gateway. Optionally, the data may be encrypted by encrypting them with a pin code or password.

In a next step the connectivity information including the global IP address through which the consumer electronic device can be reached through the global network have to be exchanged between the consumer electronic device and the mobile phone. This procedure is sometimes referred to as "object hyperlinking". An application on the phone requests the service parameters to be retrieved from the local network and launches a function that establishes this procedure. For this, several options exist that may each be relevant in certain environments. In the embodiment shown, the encoding unit generates a bar code of the connectivity information, such as bar code (e.g. QR or DataMatrix codes) being able to encode several thousand bytes of data in a single code. The required connectivity information can thus be encoded straight-away into a bar code format of choice. Depending on the market, QR for Japan or DataMAtrix for Korea codes might be preferred.

As shown in step 6 of FIG. 2, this bar code is presented to the user by transmitting it to the consumer electronic device, where it is displayed on the display (step 7). One of the other possibility would be to print out a paper print-out showing the bar code. Thus, the provision of the bar code might be decoupled from the device providing the service to the user. In step 8 the user captures the mobile code with an image detector present in the mobile communication unit 200. The mobile communication unit decodes the bar code and determines the connectivity information needed in the application server 300 providing the service. If the data has been encrypted, the user might be requested to enter a PIN code or password in order to proceed. Once the decoding has been carried out, the mobile communication unit being attached to the cellular network and having reasonable data coverage for requesting and controlling operator services establishes a session invocation dialog with the operator application server as shown in step 10. Within this flow the destination parameters, i.e. the connectivity information, is exchanged with the application server (step 11). The application server can then in step 12 request the needed service, the service being delivered in step 13 to the local network through the gateway and finally to the consumer electronic device in step 14. In the embodiment shown in FIG. 2 the decoding is carried out in the mobile communication unit. However, it is also possible that the mobile communication unit 200 receives the photo including the bar code and transmits it directly to the application server, the application server being responsible for decoding the received connectivity information.

If the bar code technology has been used and different consumer electronic devices are present in the local network, the different devices and the respective connectivity information can be presented to the user together with information about the corresponding device and service. The user can then select one of the consumer electronic devices.

In the embodiment shown in FIG. 2 the bar code technology is used. This technology has the advantage that it is cheap to deploy and that mobile codes can be interpreted by standard mobile communication units using the camera provided in the mobile phone. However, also other solutions may be used. By way of example, the Near Field Communication (NRC) technology may be used. With this technology, the wireless transmission of the connectivity information to the mobile phone is possible. Furthermore, the Bluetooth technology might be used to transmit the connectivity information to the mobile communication unit. Another possibility would be to use a wireless LAN access point of the local network or to use wireless fidelity for transmitting the connectivity information to the mobile communication unit. As can be seen from the above, any technology being able to transmit the connectivity information from the local network to the mobile communication unit might be used.

In FIG. 3 a slightly different embodiment is shown. The same reference numerals correspond to the steps explained in connection with FIG. 2 and are not explained in detail anymore. One difference is that the local control unit generates a list of all available consumer electronic devices in step 5a and encodes this list in the machine readable format. This list may be an XML file which can be retrieved from external service control nods such as the application server 300. This list is stored in the local control unit and a link is generated through which the list can be accessed by the application server. This link is then displayed as a bar code image in steps 6 and 7, the photo being taken in step 8. After the link has been transmitted to the application server, the application server requests the lists using the transmitted link in step 11a. The link can also be transmitted using the other transmission techniques described in connection with FIG. 2.

One option to make the list such as the XML file available is that the local control unit provides it through an integrated HTTP web server. For this purpose it will create the corresponding URI, considering a NAT port binding in the access gateway and firewall. Optionally, this URI can also be encrypted with a PIN-based encryption method. In case the bar code technology is used as shown in FIG. 3, the URI is encoded as bar code subsequently and the resulting single image is presented to the user on the consumer electronic device (step 7). When the application server 300 has received the requested list of step 7, the list is transmitted to the mobile communication unit in step 11b and shown to the user. The user has now the possibility to select one or more of the displayed consumer electronic devices in step 11c, this information being transmitted to the application server. The steps 12, 13 and 14 correspond to the ones shown in FIG. 2.

It should be mentioned that the proposed mechanisms for the bootstrapping of the operator to a consumer electronic device controlled by the mobile communication unit is applicable to a variety of services. Basically the type of supported operator services depends on the capabilities supported by the mobile communication unit as control device.

Independent of the supported type of operator services on the mobile communication unit, the supported services that can be delivered to the consumer electronic device depend on the capabilities of the consumer electronic device itself. The application server 300 should contain appropriate functionality to map the received destination device and service capabilities with the requirements of the service to be delivered.

In the following different options for varying the above-described methods are discussed. In the above-described examples the local control unit was controlled in the local network. Another possibility would be to configure the system in such a way that the application server 300 or the operator of the application server, respectively, can configure the local control unit or the gateway in such a way that the multimedia service can be streamed to the consumer electronic device. This means that the gateway of the local control unit is controlled from outside the local network. In other words the local control unit recording the connectivity information can be deployed by the operator of the application server, for example in connection with a home IMS (IP Multimedia Subsystem) gateway deployment that is already managed by this operator, but also in case a HIGA (Home IMS Gateway) is not present.

Mechanisms that can be tapped into include a remote management system, e.g. based on TR-609, which can be utilized to upload application functions onto the gateway itself. In this way, the management of the external ports used to deliver services can be "outsourced" to a trusted party, and the owner of the local network where services are delivered to is not considered with managing this feature. An operator service for, e.g. printing access codes, can be offered to the remote local area network owner and used on demand. This embodiment would be based on the assumption that a business relationship exists between the mobile network operator and the operator managing the gateway.

The control of the delivered multimedia service may be carried out using the operating elements of the mobile communication unit. However, it is also possible to put mechanisms into place that allow handling over the service control, such as trick play, requests for playlists, selection of content for playout, etc. from the mobile communication unit to the remote consumer electronic device. This will require additional logic to be present in the consumer electronic device, such as control point functionality for the invocation and management of media sessions and an advanced user interface based on browser technology. In such a case, on successful establishment of the session the user initiates a handover of service control to the consumer electronic device using a respective option in the service application running on the mobile phone. This would then be signaled to the operator's backend application server, that would now deliver an, e.g. web-based, front end to the remote rendering device presenting the user with options to perform content selection and playout management. Using an advanced remote control, the user can then manage the service without the mobile communication unit staying in the signaling loop.

If the user wishes so, control can be passed back by the mobile communication unit, either through an option on the remote consumer electronic device or by requesting control in the mobile communication unit application. This would for example allow users to dynamically select between different playout devices present in the local network for service delivery, such as television, PC, laptop or music player.

In another embodiment the local control unit in the local network can be combined with additional gateway and support functionalities, such as gateway logic allowing to terminate SIP/IMS services in the visited network and deliver them to non-IMS consumer electronic devices within this local network. This concept can also be home IMS gateway concept. Another possibility would be to provide gateway logic that supports transcoding of incoming content streams to a format supported by the consumer electronic device in the visited local network.

The invention claimed is:

1. A method for providing, by a mobile communication unit, connectivity information of a consumer electronic device, connected to a local network, to an Internet Server, the method comprising the steps of:
retrieving, by the mobile communication unit, the connectivity information of the consumer electronic device, the connectivity information at least partially identifying how the Internet Server can connect to the consumer electronic device in the local network,
transmitting, by said mobile communication unit, the retrieved connectivity information of the consumer electronic device to the Internet Server via an access network independent from the local network, wherein the connectivity information is used to connect the Internet Server and the consumer electronic device.

2. The method according to claim 1, wherein the connectivity information presented to the user of the mobile communication unit is detected by the mobile communication unit and then transmitted to the Internet Server.

3. The method according to claim 2, wherein the connectivity information encoded in a bar code format is detected by an image sensor of the mobile communication unit, decoded by the mobile communication unit and then transmitted to the Internet Server.

4. The method according to claim 1, wherein the mobile communication unit receives the connectivity information in an encrypted format, the mobile communication unit decrypting the connectivity information before it is transmitted to the Internet Server.

5. The method according to claim 1, wherein the mobile communication unit receives the connectivity information in an encrypted format, transmits it to the Internet Server, the Internet Server decrypting the connectivity information.

6. The method according to claim 1, wherein the connectivity information is transmitted from the mobile communication unit to the Internet Server using a cellular communication network, Worldwide Interoperability for Microwave Access (WiMax), or wireless Local Area Network (LAN).

7. The method according to claim 1, wherein the mobile communication unit initiates a session invocation dialog with the Internet Server of a global network when it has received the connectivity information.

8. The method according to claim 1, wherein a multimedia service provided on the Internet Server and requested by the user of the mobile communication unit is transmitted from the Internet Server to the consumer electronic device on the basis of the connectivity information of the consumer electronic device transmitted by the mobile communication unit.

9. The method according to claim 8, wherein the multimedia service delivered by the Internet Server is transmitted to the local control unit, the local control unit delivering the multimedia service to one of the consumer electronic devices in the local network.

10. The method according to claim 1, wherein the user of the requested service is identified on the basis of a subscriber identification information of the mobile communication unit.

11. A method for providing connectivity information of a consumer electronic device connected to a local network and accessible through a global network, the local network being connected to the global network via a gateway, the local network comprising a local control unit controlling the gateway and the connectivity information of the consumer electronic device in the global network, the method comprising the following steps:
retrieving, by the local control unit, the connectivity information from the consumer electronic device, the connectivity information at least partially identifying how an Internet Server can connect to the consumer electronic device in the local network,
encoding the retrieved connectivity information in a machine readable format, and
providing the encoded connectivity information of the consumer electronic device for transmission to a mobile communication unit, wherein the connectivity information is used to connect the Internet Server and the consumer electronic device.

12. The method according to claim 11, wherein the local control unit detects a local address of the consumer electronic device through which the consumer electronic device can be reached within the local network and replaces the local address by the corresponding global address of the global network that has to be used to reach the consumer electronic device from the Internet Server of the global network.

13. The method according to claim 11, wherein the local control unit determines a global routable network address of the gateway to which a multimedia service provided on the Internet Server should be directed, the connectivity information containing the global routable network address.

14. The method according to claim 11, wherein the local control unit detects the consumer electronic devices present in the local network and the corresponding multimedia service capabilities of each consumer electronic device and determines the consumer electronic devices that are made available for delivery of a multimedia service provided by the Internet Server.

15. The method according to claim 11, wherein the local control unit generates a list of available consumer electronic devices of the local network, the list containing the available consumer electronic devices together with their connectivity information.

16. The method according to claim 15, wherein the list of available consumer electronic devices is presented to the user of a mobile communication unit, wherein, when the user of the mobile communication unit has selected one or more of the available consumer electronic devices from the list, the local control unit transmits the information about the selected consumer electronic device together with its connectivity information to the mobile communication unit.

17. The method according to claim 16, wherein the list or the link are stored in the local network in a machine readable format.

18. The method according to claim 16, wherein the list or the link are encoded in a bar code format and displayed on the consumer electronic device.

19. The method according to claim 16, wherein the connectivity information of the selected consumer electronic device or the link is transmitted to the mobile communication unit using wireless transmission technology.

20. The method according to claim 19, wherein the connectivity information of the selected consumer electronic device or the link is transmitted to the mobile communication unit using a Near Field Communication (NFC) technology.

21. The method according to claim 19, wherein the connectivity information of the selected consumer electronic device or the link is transmitted to the mobile communication unit using a Bluetooth technology.

22. The method according to claim 19, wherein the connectivity information of the selected consumer electronic device or the link is transmitted to the mobile communication unit using a wireless transmitter of the local network.

23. The method according to claim 15, wherein the list of available consumer electronic devices is stored on the local network, a link being generated through which the list of available consumer electronic devices together with the corresponding connectivity information can be reached by the Internet Server through the global network, wherein the local control unit transmits the link of the stored list to the mobile communication unit.

24. The method according to claim 23, wherein the Internet Server requests the list of consumer electronic devices from the local network using the transmitted link transmitted from the mobile communication unit to the Internet Server, the Internet Server transmitting the list to the user of the mobile communication unit, the user selecting in the list one or more of the consumer electronic devices for service delivery.

25. The method according to claim 11, wherein the local control unit encrypts the connectivity information before transmission to the mobile communication unit.

26. A method for encoding connectivity information of a consumer electronic device accessible through a global network, comprising the following steps:
retrieving the connectivity information of the consumer electronic device to the global network, wherein the connectivity information is used to connect an Internet Server and the consumer electronic device through a local network that is connected to the global network, the consumer electronic device being connected to the local network,
encoding the retrieved connectivity information of the consumer electronic device in a bar code format.

27. A mobile communication unit transmitting connectivity information of a consumer electronic device, connected to a local network, to an Internet Server, the mobile communication unit comprising:
a receiver receiving the connectivity information of the consumer electronic device from the local network, the connectivity information at least partially identifying how the Internet Server can connect to the consumer electronic device in the local network, a decoding unit decoding the received connectivity information, a transmitter transmitting the received connectivity information of the consumer electronic device to the Internet Server via an independent access network independent from the local network, wherein the connectivity information is used to build up a connection between the Internet Server and the consumer electronic device.

28. The mobile communication unit according to claim 27, wherein the decoding unit comprises a bar code decoder decoding the connectivity information received in the bar code format.

29. A local network control unit providing a connectivity information of a consumer electronic device that is connected to a local network and accessible through a global network, the local network being connected to the global network via a gateway, the local network control unit controlling the gateway and the connectivity information of the consumer electronic device in the global network, the local network control unit comprising:

a retrieving unit retrieving the connectivity information from the consumer electronic device, the connectivity information at least partially identifying how an Internet Server can connect to the consumer electronic device in the local network, and an encoding unit for encoding the retrieved connectivity information of the consumer electronic device in a machine readable format, and an output unit for outputting the encoded connectivity information to a mobile communication unit.

30. The local network control unit according to claim 29, wherein the encoding unit comprises a bar code format encoding unit encoding the retrieved connectivity information in a bar code format.

31. The local network control unit according to claim 29, wherein the output unit is selected from at least one of the following units:

a display displaying the received connectivity information and a transmitter transmitting the connectivity information to the mobile communication unit.

* * * * *

UNITED STATES PATENT AND TRADEMARK OFFICE
CERTIFICATE OF CORRECTION

PATENT NO. : 8,879,524 B2  Page 1 of 1
APPLICATION NO. : 12/935984
DATED : November 4, 2014
INVENTOR(S) : Fasbender et al.

It is certified that error appears in the above-identified patent and that said Letters Patent is hereby corrected as shown below:

IN THE SPECIFICATION

In Column 8, Line 21, delete "cells" and insert -- calls --, therefor.

In Column 9, Line 9, delete "electronic device 200" and insert -- electronic device 110 --, therefor.

In Column 10, Line 45, delete "(NRC)" and insert -- (NFC) --, therefor.

Signed and Sealed this
Fifth Day of July, 2016

Michelle K. Lee
*Director of the United States Patent and Trademark Office*